United States Patent
Gutierrez et al.

(10) Patent No.: US 8,371,099 B2
(45) Date of Patent: *Feb. 12, 2013

(54) POWER GENERATION SYSTEM INCORPORATING MULTIPLE RANKINE CYCLES

(75) Inventors: Juan P. Gutierrez, Oviedo, FL (US); Terrence B. Sullivan, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/097,383

(22) Filed: Apr. 29, 2011

(65) Prior Publication Data

US 2011/0203289 A1 Aug. 25, 2011

Related U.S. Application Data

(62) Division of application No. 11/649,572, filed on Jan. 4, 2007, now Pat. No. 7,934,383.

(51) Int. Cl.
*F02C 6/00* (2006.01)

(52) U.S. Cl. ............ 60/39.182; 60/39.5; 60/670; 60/773

(58) Field of Classification Search .................. 60/39.5, 60/39.12, 39.511, 39.52, 670, 39.182, 772, 60/773, 774, 775, 783, 784; 122/7 R, 7 B See application file for complete search history.

(56) References Cited

U.S. PATENT DOCUMENTS

| | | | | |
|---|---|---|---|---|
| 2,911,789 A * | 11/1959 | Baker | ........... | 60/39.182 |
| 3,413,805 A * | 12/1968 | Heller et al. | ........... | 60/651 |
| 3,769,795 A * | 11/1973 | Rostrom | ........... | 60/665 |
| 4,442,665 A * | 4/1984 | Fick et al. | ........... | 60/39.12 |
| 4,785,622 A * | 11/1988 | Plumley et al. | ........... | 60/39.12 |
| 5,050,375 A * | 9/1991 | Dickinson | ........... | 60/39.12 |
| 5,303,544 A * | 4/1994 | Kobayashi et al. | ........... | 60/39.182 |
| 5,388,395 A * | 2/1995 | Scharpf et al. | ........... | 60/781 |
| 5,509,264 A * | 4/1996 | Ito et al. | ........... | 60/39.12 |
| 5,581,128 A * | 12/1996 | Royle | ........... | 290/4 D |
| 5,687,570 A * | 11/1997 | Bronicki et al. | ........... | 60/655 |
| 5,704,206 A * | 1/1998 | Kaneko et al. | ........... | 60/39.12 |
| RE36,497 E * | 1/2000 | Tomlinson | ........... | 60/783 |
| 6,032,456 A * | 3/2000 | Easom et al. | ........... | 60/793 |
| 6,244,035 B1 * | 6/2001 | Krill | ........... | 60/783 |
| 6,430,915 B1 * | 8/2002 | Wiant et al. | ........... | 60/39.12 |
| 6,519,927 B2 * | 2/2003 | Liebig et al. | ........... | 60/39.182 |
| 6,604,354 B2 * | 8/2003 | Oto et al. | ........... | 60/39.182 |
| 6,851,266 B2 * | 2/2005 | Liebig | ........... | 60/772 |
| 6,874,322 B2 * | 4/2005 | Schwarzott | ........... | 60/772 |
| 6,895,740 B2 * | 5/2005 | Erickson | ........... | 60/39.182 |
| 6,976,362 B2 * | 12/2005 | Sheppard et al. | ........... | 60/780 |
| 7,168,233 B1 * | 1/2007 | Smith et al. | ........... | 60/39.182 |
| 7,584,598 B2 * | 9/2009 | Benz et al. | ........... | 60/39.17 |

(Continued)

*Primary Examiner* — William H Rodriguez (57) ABSTRACT

A power generation system (100) and a method of generating power. In one embodiment of the system shown in FIG. 1, a gasification subsystem (1) is configured to convert a carbonaceous fuel to fuel suitable for combustion in a gas turbine (48). A first power generation cycle (2) includes the gas turbine (48) coupled to receive fuel from a gasifier (24). A first Rankine cycle (3) is coupled to receive thermal energy from at least the first power generation cycle (2) and generate power with a first vapor turbine (58). A second Rankine cycle (4) is coupled to receive thermal energy from the gasification subsystem (1) or the first power generation cycle (2) and generate power with a second vapor turbine (82). In an associated method, syngas (26) is generated and processed to remove components therein. Power is generated in a first turbine (48) with the processed syngas (33). Power is generated in a second turbine (58) with heat recovered from exhaust produced by the first turbine (48). Power is generated in a third turbine (82) with heat recovered from the syngas (33).

6 Claims, 5 Drawing Sheets

U.S. PATENT DOCUMENTS 7,640,724 B2 * 1/2010 Bellows et al. ............ 60/39.182
2004/0139747 A1 * 7/2004 Erickson ......................... 60/772
2007/0151256 A1 * 7/2007 Kamohara et al. .............. 60/781
2010/0109338 A1 * 5/2010 Yakobson et al. ............ 290/1 A

* cited by examiner

POWER GENERATION SYSTEM INCORPORATING MULTIPLE RANKINE CYCLES

CROSS REFERENCE TO RELATED APPLICATIONS

This is a divisional application of U.S. patent application Ser. No. 11/649,572, filed Jan. 4, 2007 now U.S. Pat. No. 7,934,383.

FIELD OF THE INVENTION

The present invention relates generally to power systems, and more particularly, to combined cycle power generation systems.

BACKGROUND OF THE INVENTION

Continual increases in the price of natural gas and fuel oil, and demands for generating electricity with reduced environmental impact, are stimulating advancements in technologies for deploying Integrated Gasification Combined Cycle (IGCC) power systems. Design of new power plants and retrofitting of older facilities, e.g., conversion of natural gas combined cycle (NGCC) plants to IGCC plants, present opportunities to develop systems and methods which increase overall power plant efficiencies.

In IGCC systems, a carbonaceous fuel such as coal is converted to a synthetic gas fuel, termed syngas. This is a mixture typically formed in a gasifier by partial oxidation of hydrocarbons at elevated temperatures. Oxygen-blown gasifiers typically source oxygen in order to minimize generation of by-products such as $NO_x$ compounds. An oxygen source can be developed in a high temperature air separation process which uses an Ion Transport Membrane (ITM) Air Separation Unit. When syngas is generated by gasification of coal with oxygen, typical constituents of the syngas include $H_2$, CO, $CO_2$, and $CH_4$. Often the syngas will include impurities such as sulfides, nitrous components, and dust particles. The latter are normally removed from the mixture prior to combustion in order to provide an environmentally clean exhaust gas from the combustion turbine.

Syngas produced in an IGCC system is typically directed to a gas combustor for oxidation and generation of high pressure, high temperature exhaust which is sent to a gas turbine to provide a first source of mechanical power. Sensible heat, present in various fluids within the gasification subsystem of the IGCC system, or within the associated gas turbine subsystem, is commonly recovered by generating steam. Normally, most of the steam is routed through a turbine.

The efficiency of large scale commercial gasification systems are typically below 80 percent. Means of improving the efficiency of these and other power generating systems are desired, as even small improvements in plant efficiency have large impacts on the cost and viability of electrical power production from carbonaceous solid fuel sources.

BRIEF DESCRIPTION OF THE DRAWINGS

Features of the invention will be best understood when the following detailed description is read in conjunction with the accompanying drawings, wherein.

DETAILED DESCRIPTION OF THE INVENTION

The Rankine cycle of an IGCC power generation system is normally powered by sensible heat recovered from hot, expanded gas exhausted by the gas turbine. After exiting the gas turbine, this hot gas is typically routed through a Heat Recovery Steam Generator (HRSG) to create a supply of high temperature, high pressure steam for the turbine section.

The gasification process is exothermic, creating syngas at such a high temperature that it must be cooled before undergoing conventional cleaning processes to remove undesirable impurities. Syngas coolers often generate steam which may also be directed to the turbine section although a portion of the steam may heat a saturator loop which adds moisture to the syngas. Heat from the hot syngas may also be transferred to amine condensate used for sulfur removal in the syngas cleaning process. However, due to practical limitations, a portion of the heat generated in the gasification and gas turbine subsystems is not recovered.

In accord with the invention, an exemplary IGCC system includes at least first and second Rankine cycles with the first Rankine cycle receiving sensible heat from high temperature heat sources including the hot, expanded gas exhausted by the gas turbine via the HRSG. This superheated steam expands in a steam turbine to generate mechanical power. An exemplary second Rankine cycle enables extraction of sensible heat from other heat sources in the IGCC system, including sources which might otherwise not be utilized for heat recovery, to generate additional mechanical power and increase overall system efficiency. Both Rankine cycles may use water as the working fluid, but in some embodiments of the invention an organic fluid may be preferred.

The invention concepts may be practiced with existing and retrofitted power systems, as well as new power generation systems. In a first exemplary embodiment of the invention, an IGCC system 100 shown in FIG. 1 includes a gasification subsystem 1, a gas turbine subsystem 2, a first Rankine cycle 3, and a second Rankine cycle 4.

Figure 1:
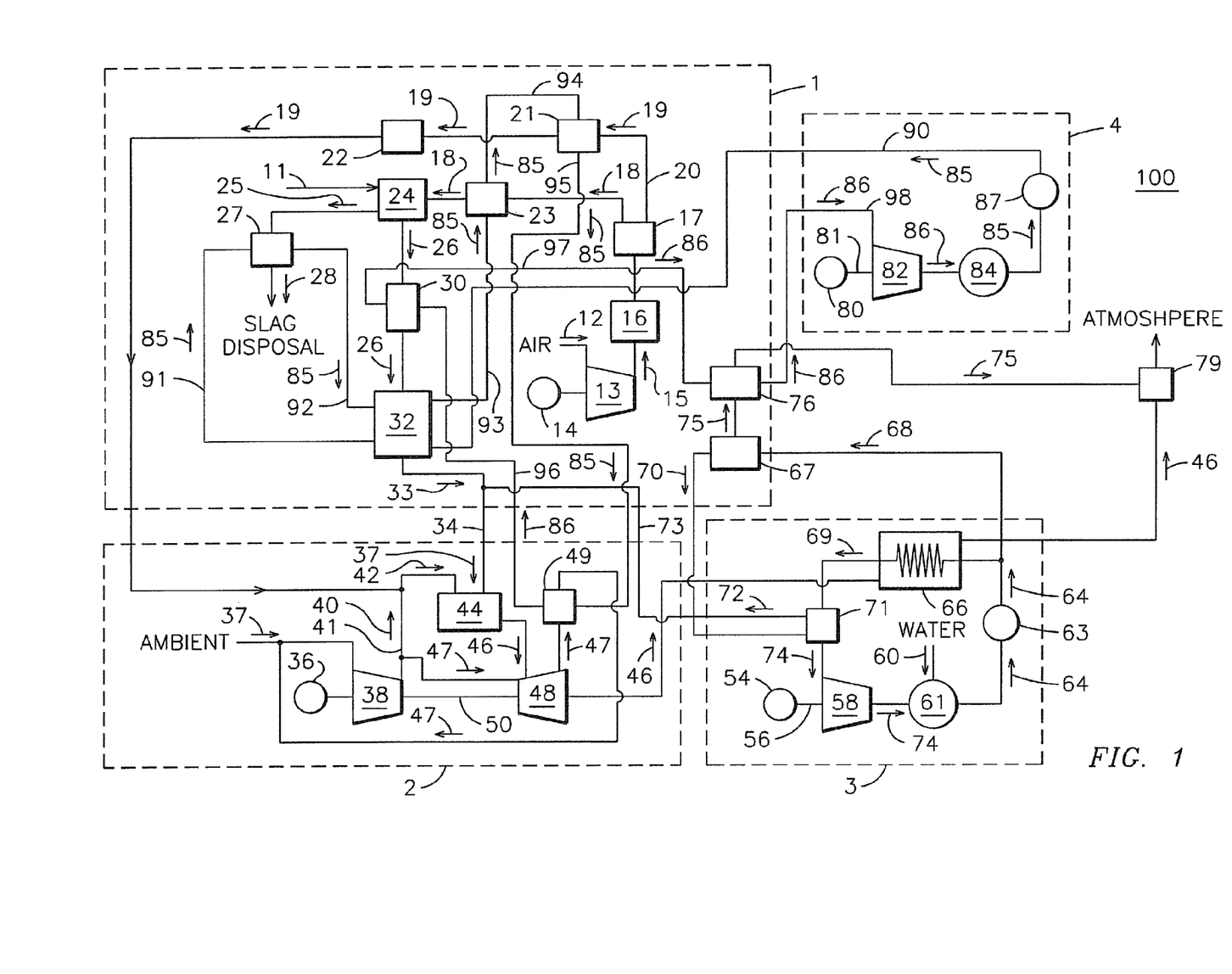
FIG. 1 is a schematic representation of an IGCC system constructed according to one embodiment of the invention.
Figure 2:
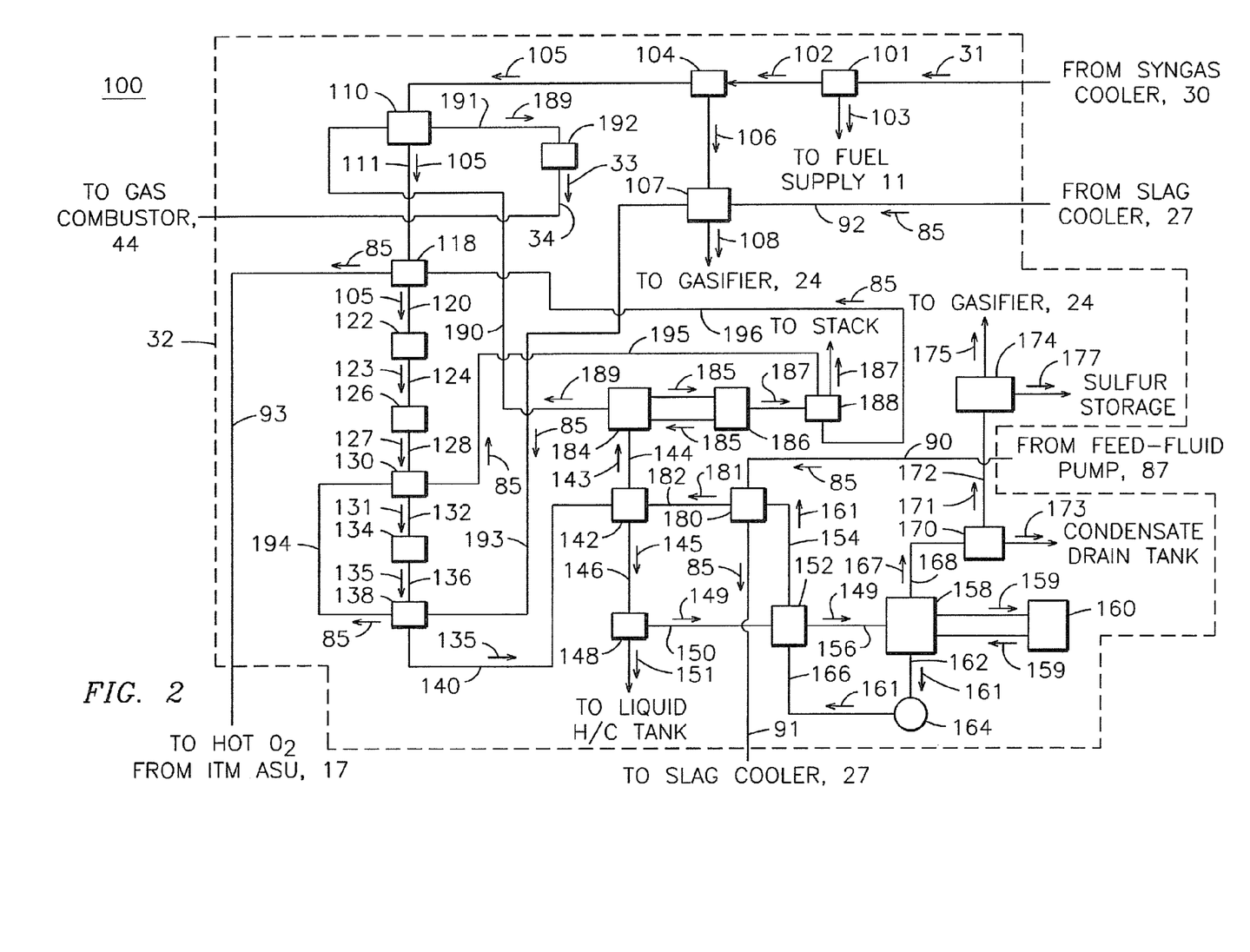
FIG. 2 is a schematic representation of a syngas clean-up unit in the system of FIG. 1.

The gasification subsystem 1 includes a gasifier unit 24, an ITM air separation unit 17, an air pre-heater 16, an air compressor 13, a syngas cooler 30, and a syngas clean-up unit 32. These and other components are merely exemplary and could readily be substituted with other well known components capable of performing similar functions. For example, the ITM air separation unit could be replaced with a cryogenic air separation unit. It also includes an oxygen cooler 23, an oxygen-depleted air cooler 21, an oxygen-depleted air quench column 22, a slag cooler 27, an auxiliary boiler 67, and an auxiliary boiler heat exchanger 76. Components of the syngas clean-up unit 32, including heat exchangers forming part of the Rankine cycle 4, are illustrated in FIG. 2.

In the gasification subsystem 1 the gasifier 24 receives a hydrocarbon fuel 11, such as coal slurry, and oxygen 18. The compressor 13, driven by a motor 14, inducts ambient air 12 and delivers high pressure air 15 to the pre-heater 16 which elevates the air temperature prior to entry into the ITM Air Separation Unit (ASU) 17. The ITM ASU 17 produces a supply comprising a high concentration of oxygen 18 and a supply of oxygen-depleted air 19, primarily nitrogen, while operating in a temperature range of about 1500-1700° F.

(816-927 C). The hot oxygen, generally in the temperature range of about 1500-1700° F. (816-927 C), is sent through the cooler 23 for temperature reduction prior to entry into the gasifier 24. The hot oxygen-depleted air, also in the temperature range of about 1500-1700° F. (816-927 C), is processed through the cooler 21 and the air quench column 22, each placed in an oxygen-depleted air supply line 20 which provides the oxygen depleted air 19 to a high pressure air supply line 41 in the gas turbine subsystem 2. In the gasifier 24 the hydrocarbon fuel 11 undergoes partial oxidation to generate primarily carbon monoxide and hydrogen in an exothermic reaction. This hot syngas 26 exits the gasifier 24, generally in the temperature range of about 1800-2500° F. (982-1371 C).

The gasifier 24 also produces molten slag 25 which is composed of inorganic material present in the fuel 11. The slag 25 is continually removed from the gasifier 24 and cooled in the heat exchanging slag cooler 27 for disposal as a solid material 28. To meet air quality requirements impurities present in the syngas 26, such as sulfur, nitrous oxide, and dust particles, are removed in the gas clean-up unit 32. Prior to entering the clean-up unit 32, the syngas cooler 30 reduces the temperature of the syngas 26. The gas clean-up unit 32 comprises one or more cyclones, water scrubbers, and sulfur removal processing equipment. Typical components of the syngas clean-up unit 32 are shown in FIG. 2.

The auxiliary boiler 67 in the gasification subsystem 1 receives a portion 68 of the feed-water 64 from the feed-water pump 63 in the first Rankine cycle 3 and converts this into a supply of steam 70. The steam 70 enters the steam chest 71. Hot exhaust from the boiler 67, typically 2000-2500° F. (1093-1371 C), is directed to the boiler exhaust cooler 76 for recovery of heat, shown in this example as effected by heating the steam 86 associated with the second Rankine cycle 4.

The gas turbine subsystem 2 includes an air-compressor 38, a combustor 44, a rotor cooling air heat exchanger 49, a gas turbine 48, and an electrical generator 36. The compressor 38 inducts ambient air 37 and produces pressurized air 40 which is directed to the combustor 44. Nitrogen or oxygen-depleted air 19 is added to the compressed air 40, forming a supply of diluted compressed air 42. The dilution reduces flame temperature and $NO_x$ formation in the gas combustor 44.

The cleaned syngas 33 flows into the gas combustor 44 through a fuel supply line 34. Steam 72 is routed from the steam chest 71 through a steam supply line 73 and is added to the syngas 33 to regulate the combustion process temperature, the internal combustor temperature profile, and the combustor exit temperature by varying the steam flow rate. The mixture 37 of steam 72 and syngas 33 enters into the combustor 44 of the gas turbine subsystem 2. The fuel mixture 37 reacts with the diluted air 42 in the combustor 44 to produce a hot, pressurized gas 46 which is directed into the gas turbine 48 where the hot gas 46 expands, thereby producing power in a rotor shaft 50 to drive both the compressor 38 and the electrical generator 36. As a result of having been expanded in the turbine 48, the temperature of the expanded gas 46 exhausted from the turbine 48 is considerably lower than the temperature of the hot gas 46 entering the turbine 48. The expanded gas 46, typically in the range of 850°-1100° F. (454-593 C), is directed to the Heat Recovery Steam Generator (HRSG) 66 in the first Rankine cycle for recovery of heat. As illustrated, a portion 47 of the pressurized air 40 exiting the compressor 38 may be routed through the gas turbine 48 to cool the rotor assembly in the turbine 48. The heated air 47 exiting the turbine 48 is cooled in the rotor cooling air heat exchanger 49 and is then mixed with the incoming air 37.

The first Rankine cycle 3 comprises a heat recovery steam generator 66, the steam chest 71, a steam turbine 58, an electrical generator 54, a condenser 61, and a feed-water pump 63. The steam turbine 58 receives a supply of high pressure, high temperature steam 74 from the steam chest 71. This working steam, generally at 1300-2000 psia (8961-13786 kPa), and 900-1100° F. (482-593 C), passes through the turbine 58, producing power in the rotor shaft 56 to drive the electrical generator 54. In other designs, the steam turbine 58 may be coupled to the shaft 50 and generator 36 of the gas turbine subsystem 2. Upon exiting the turbine 58 the cooled, expanded steam 74 enters the condenser 61 for recycling as feed-water 64. Fresh water 60 is supplied to the condenser 61 to compensate for the loss of water in the system 100. The feed-water 64 with assistance of the pump 63 flows into the HRSG 66 where it is converted to superheated steam 69 as it receives heat from the hot effluent gas 46 exhausted from the gas turbine 48. After flowing through the HRSG 66, the cooled, expanded gas 46 is then discharged to atmosphere via a stack 79 while the superheated steam 69 is sent to the steam chest 71.

The second Rankine cycle 4 includes a steam turbine 82, an electrical generator 80, a condenser 84, and a feed-fluid pump 87. The steam turbine 82 receives a supply of low pressure, low temperature steam 86, relative to the steam 74 generated in the HRSG 66, from an auxiliary boiler exhaust heat exchanger 76. The steam 86 powers the turbine 82 with an entry temperature in the range of 700°-800° F. (371-427 C) and pressure in the range of 15-25 psia (103-172 kPa), and turns the rotor shaft 81 to drive the electrical generator 80. In other designs, the steam turbine 82 may be coupled to the shaft 50 and generator 36 of the gas turbine subsystem 2 or to the shaft 56 and generator 54 of the first Rankine cycle 3.

Upon exiting the turbine 82 the cooled, expanded steam 86 enters the condenser 84 for recycling as feed-water 85. The pump 87 moves the feed-water 85 through a network of heat exchangers in the system 100 which generate the steam 86 and elevate it to a superheated state. With reference to both FIG. 1 and FIG. 2, initially the feed-water 85 is circulated under relatively low pressure, generally in the range of 25-35 psia (172-241 kPa), through a line 90 to the syngas cleaning unit 32 where it extracts heat from an MDEA cooler 180. The water 85 then flows out of the syngas cleaning unit 32 through line 91 to the slag cooler 27 where it to receives heat from the hot slag 25. The water 85 next returns through line 92 to the syngas clean-up unit 32 where it flows through a water scrubber heat exchanger 107 which transfers heat from a first water scrubber 104. The water 85 then flows through line 193 to enter a sour gas heat exchanger 138 for further heating, followed by flow through line 194 into a sour water heat exchanger 130 to receive heat from syngas exiting a second water scrubber 126.

Next the water 85 flows through line 195 to a saturator heat exchanger 188 where it receives heat from exhaust gas 187, being output by a saturator heater 186. The water 85 then flows through line 196 to the syngas heat exchanger 118 to receive heat from hot syngas which flows between a cross heat exchanger 110 and a COS hydrolysis unit 122. The heated water 85 then flows through line 93 and out of the syngas clean-up unit 32 to the oxygen cooler 23 where it receives heat from the hot oxygen 18 exiting the ITM ASU 17. The water 85 then flows through line 94 to the oxygen-depleted air cooler 21 to receive heat from the hot oxygen-depleted air 19. The hot water 85 then flows through line 95 to the rotor cooling air heat exchanger 49 where it is converted to steam with heat received from rotor cooling air 47 that exits the gas turbine 48.

The steam 86 is then superheated, first flowing through line 96 to the syngas cooler 30 where it receives further heating from the hot syngas 26 exiting the gasifier 24; and then traveling to through the boiler exhaust cooler 76 which transfers heat from the exhaust 75 exiting the auxiliary boiler 67. The steam 86 may also be heated at various stages with supplemental sources including tail gas exhaust from the sulfur recovery unit (not shown), Claus reactors and a SCOT reactor in the sulfur recovery unit (not shown).

Syngas from a coal gasifier contains impurities such as entrained soot, ash, $H_2S$, $NH_3$, COS, and HCN, which are removed in the syngas purification process. First, ashes and inorganic particles are removed in cyclones and water scrubbers. Then the syngas is further cooled to a temperature suitable for a hydrolysis reaction, generating sour gas, i.e., a form of syngas containing $H_2S$, $CO_2$, and ammonia. After the ammonia is removed in a water scrubber and the $H_2S$ and $CO_2$ are removed in an MDEA contactor connected to an MDEA regenerator, the cleaned syngas is saturated with steam and send through a final filter before entering the gas combustor 44. The MDEA solution, rich in $H_2S$ and $CO_2$, is heated in the MDEA regenerator to generate fresh MDEA and release a stream of acidic gas, primarily comprising $H_2S$, $CO_2$, and water vapor. In a sulfur recovery unit the $H_2S$ is converted to elemental sulfur for disposal. Heat exchangers may be included to recover sensible heat from numerous heat sources present in the syngas purification process.

The syngas clean-up unit 32 includes a cyclone 101, the first water scrubber 104, the syngas cross heat exchanger 110, a COS hydrolysis unit 122, the second water scrubber 126, a sour water accumulator 134, an MEDA contactor 142, a syngas saturator 184, the saturator heater 186, and a final filter 192 for generating clean syngas 33. It also includes a rich MDEA surge drum 148, an MDEA cross heat exchanger 152, an MDEA regenerator 158, an MDEA reboiler 160, an MDEA circulation pump 164, a condensate accumulator 170, and a sulfur recovery unit 174 for recovery of sulfur 177. In addition, the syngas clean-up unit 32 includes a network of heat exchangers: the MDEA cooler 180, the water scrubber heat exchanger 107, the sour gas heat exchanger 138, the sour water heat exchanger 130, the saturator heat exchanger 188, and the syngas heat exchanger 118.

In the syngas clean-up unit 32, syngas 31 flowing from the syngas cooler 30 first enters the cyclone 101, which centrifugally removes the ash and mineral particles 103. The syngas 102 exiting the cyclone 101 travels to the first water scrubber 104 where char in the syngas 102 is removed. The syngas 105 leaving the first water scrubber 104 is in the temperature range of 250-350° F. (121-177 C). Water containing the char 106 is directed to the water scrubber heat exchanger 107 for recovery of heat. The syngas 105 is then further cooled by several hundred degrees, e.g., to the range of 500-700° F. (260-371 C), when passing through the syngas cross heat exchanger 110 where the relatively hot syngas 105 heats cleaned syngas 189 exiting the syngas saturator 184. The cooled syngas 105 is routed through line 111 to the syngas heat exchanger 118 while the warmed clean syngas 189 travels through line 191 to the final filter 192. The syngas heat exchanger 118 transfers heat from the syngas 105 exiting the cross heat exchanger 110 before the gas 105 travels through the line 120 to the COS hydrolysis unit 122.

The COS hydrolysis unit 122, operating in the temperature range of 250°-350° F. (121-177 C), hydrolyzes the syngas constituents COS and HCN to form $CO_2$, $H_2S$, $NH_3$ and CO. The sour gas 123, i.e., syngas containing $H_2S$, exiting the COS hydrolysis unit 122 is directed to the second water scrubber 126 through a line 124 to remove water-soluble gases such as $NH_3$. The warm sour gas 127 flowing out of the water scrubber 126 through line 128, generally at 270°-330° F. (132-166 C), is cooled to 220°-250° F. (104-121 C) in the sour water heat exchanger 130. The cooled sour gas 127 enters the sour water accumulator 134 through line 132 where moisture in the sour gas 127 is removed. The dry sour gas 135 is directed through line 136 to the sour gas heat exchanger 138 and cooled further to 90°-110° F. (32-43 C). Traveling through line 140, the sour gas 135 enters the bottom of the MDEA contactor 142 for $H_2S$ separation. A supply of fresh MDEA 181 enters the top of the contactor 142 through a line 182 from the MDEA cooler 180. An acid-gas-rich-amine solution 145 leaves the bottom of the contactor 142 through a line 146 at an elevated temperature. Through line 144 the cleaned syngas 143 exiting the MDEA contactor 142 travels to the saturator 184 in which the syngas 143 is saturated with moisture 185 circulating from the saturator heater 186. The heat exchanger 188 recovers heat from exhaust of the saturator heater 186. The moisture-saturated syngas 189 exiting the saturator 184 is directed to the syngas cross heat exchanger 110 to receive heat from the hot syngas 105 before entering the final filter 192. After passing the final filter 192, the cleaned syngas 33 is routed to the combustor 44 in the gas turbine subsystem 2 through a fuel supply line 34.

The MDEA solution 145 containing $H_2S$ and $CO_2$ travels to the rich MDEA surge drum 148 from the MDEA contactor 142. The surge drum 148 allows separation of hydrocarbon liquid 151 from the solution 149. The MDEA solution 149 exiting the surge drum 148 is routed to the MDEA cross heat exchanger 152 through line 150 and then on to the MDEA regenerator 158. In the MDEA cross heat exchanger 152, the MDEA solution 149 containing $H_2S$ and $CO_2$ is heated by a fresh MDEA solution 161 from the MDEA regenerator 158 delivered to the heat exchange 152 through line 166. $H_2S$ and $CO_2$ in the MDEA solution 149 are then removed in the MDEA regenerator 158 by heating the solution 149 to the range of 100°-200° F. (38-93 C) MDEA solution 149 entering the regenerator 158 is continuously heated with circulating steam 159 from the MDEA boiler 160 and fresh MDEA solution 161 travels with assistance of the MDEA pump 164 from the regenerator 158, through lines 162 and 166 to the MDEA cross heat exchanger 152. The cooled MDEA 161 exiting the cross heat exchanger 152 travels to the MDEA cooler 180 for further temperature reduction.

Acid gas 167, exiting the MDEA regenerator 158, is routed to the condensate accumulator 170. Condensate 173 in the accumulator is mostly water which is drained. The remaining acid gas 171 enters the sulfur recovery unit 174 where $H_2S$ is converted to sulfur 177 for disposal while the tail gas 175 is routed to the gasifier 24.

Figure 3:
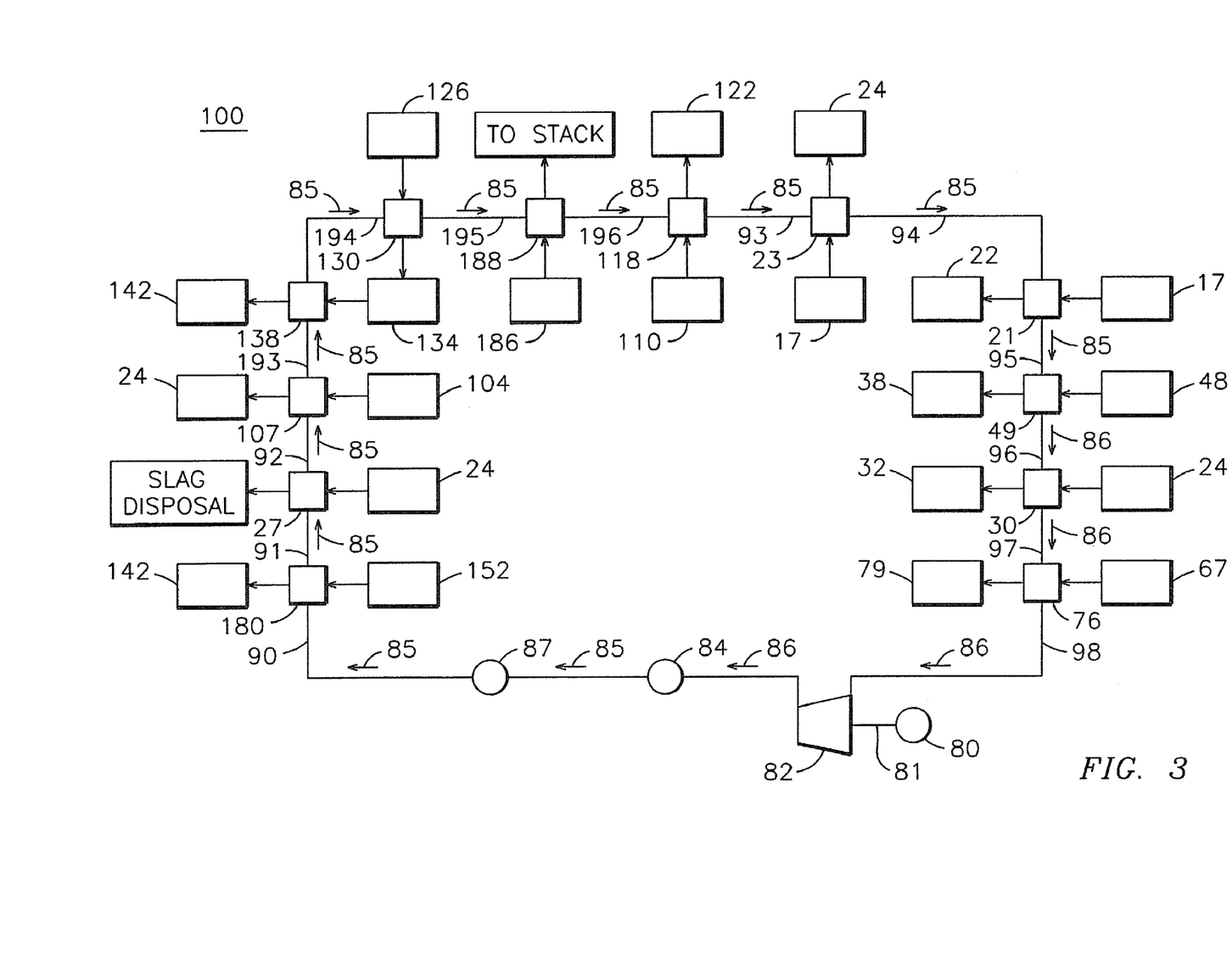
FIG. 3 illustrates a Rankine cycle in the system of FIG. 1.

FIG. 3 illustrates an exemplary order in which a series of exchangers transfer heat to the working fluid in the second Rankine cycle 4.

The second Rankine cycle 4 is based on recovery of heat from multiple sources ranging from a low temperature, e.g., below 800° F., to upwards of 2100° F. (1149 C). In the embodiment of the system 100, water is a suitable working fluid when some of the heat sources have relatively high temperatures, e.g., 1600-2100° F. (871-1149 C). An organic fluid, such as R-245fa, can be more effective as the working fluid than water if the maximum temperature of the heat sources is below 800° F. (427 C). At higher temperatures organic fluids can create non-condensable substances that degrades the performance of heat recovery. However, for low temperature heat sources, organic fluids generally having a lower boiling point, a lower specific volume, and a lower specific volume than water, the higher mass flow rate of these organic fluids can result in extraction of more heat per unit volume, thereby improving the efficiency of the Rankine cycle.

Figure 4:
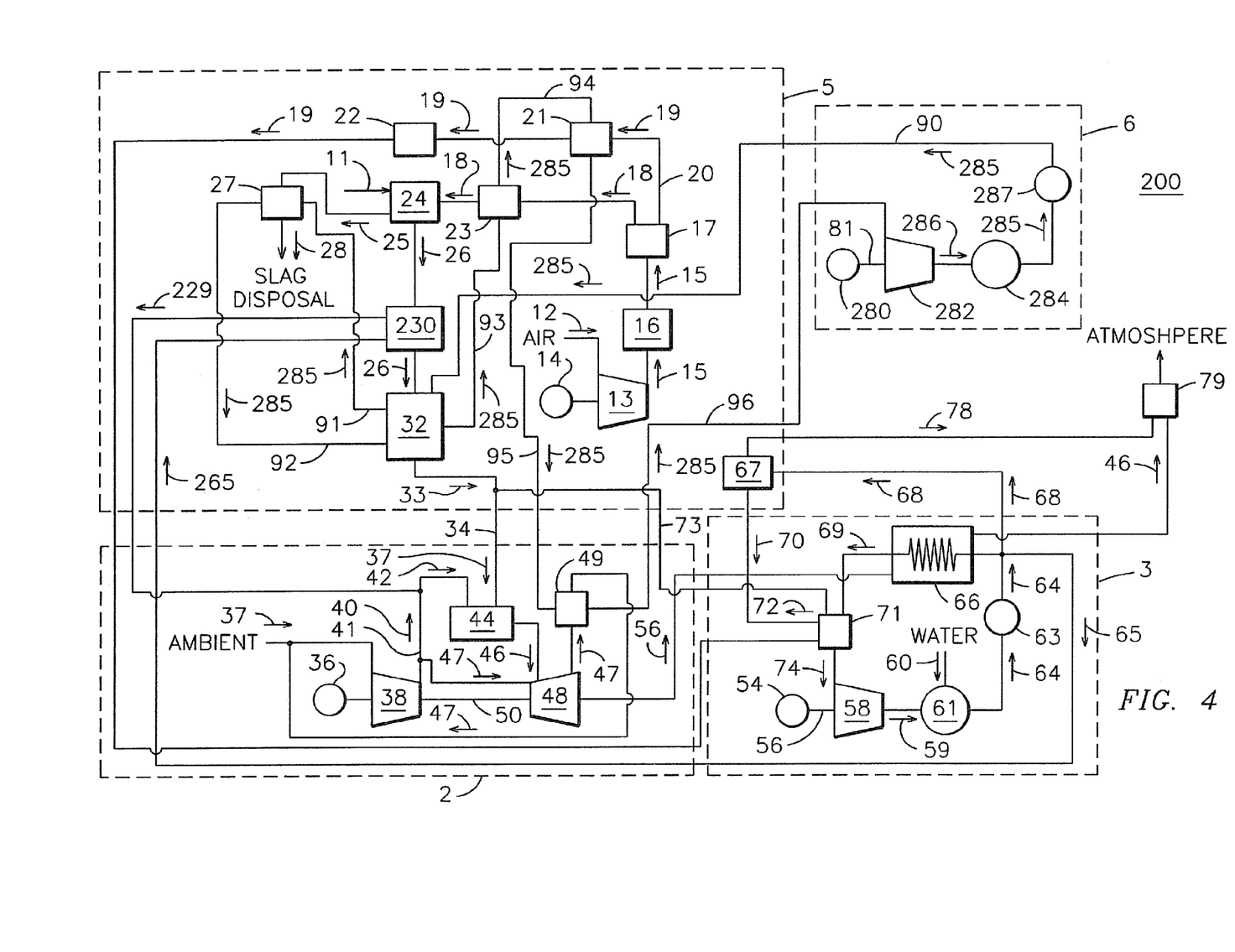
FIG. 4 is a schematic representation of an IGCC system according to an alternate embodiment of the invention.

FIG. 4 illustrates an IGCC system 200 according to another embodiment of the invention wherein a first Rankine cycle 3 receives high temperature, high pressure steam from a steam chest 271 and a second Rankine cycle 6 operates with a working fluid receiving heat recovered from multiple low temperature heat sources, e.g., below 800° F. (427 C). The operation of the system 200 differs from the system 100 shown in FIG. 1 in that heat recovered from high temperature sources such as the syngas cooler and the auxiliary boiler is part of the first Rankine cycle 3 which uses water as the working fluid. The system 200 includes the gas turbine subsystem 2 and the first Rankine cycle 3, as described with respect to FIG. 1, a gasification subsystem 5 and the second Rankine cycle 6.

The gasification subsystem 5 includes a gasifier unit 24, an ITM air separation unit 17, an air pre-heater 16, an air compressor 13, a syngas clean-up unit 32, and a syngas cooler 230. It also includes an oxygen cooler 23, an oxygen-depleted air cooler 21, an oxygen-depleted air quench column 22, a slag cooler 27, and an auxiliary boiler 67.

In the gasification subsystem 5, the gasifier unit 24 receives a hydrocarbon fuel 11, e.g., a coal slurry, and oxygen 18 from the ITM ASU 17. The compressor 13, driven by motor 14, inducts the ambient air 12 and delivers the high pressure air 15 to the pre-heater 16. The hot oxygen 18 exiting the ITM ASU 17 is cooled in the oxygen cooler 23 before entering the gasifier 24. The oxygen-depleted air cooler 21 and the oxygen-depleted air quench column 22, each placed in the oxygen-depleted air supply line 20, cool the oxygen depleted air 19 before it enters the high pressure air supply line 41 in the gas turbine subsystem 2.

In the gasifier unit 24 the hydrocarbon fuel 11 undergoes partial oxidation to generate hot syngas 26. The gasifier 24 also produces molten slag 25 which is continually removed from the gasifier 24 and cooled down in the heat exchanging slag cooler 27 for disposal. Impurities present in the syngas 26, such as sulfur, nitrous oxide, and dust particles, are removed in the gas clean-up unit 32. Prior to entering the clean-up unit, the syngas cooler 230 reduces the temperature of the syngas 26. A portion 65 of the feed-water 64 in the first Rankine cycle 3 circulates through the syngas cooler 230 to recover syngas heat and be converted into steam 229 which is then sent to the steam chest 71. The gas clean-up unit 32 comprises one or more cyclones, water scrubbers, and sulfur removal processing equipment such as shown in FIG. 2. The auxiliary boiler 67 in the gasification subsystem 5 receives a portion 68 of the feed-water 64 from the feed-water pump 63 in the first Rankine cycle 3 for conversion into steam 70 which is also sent to the steam chest 71.

The second Rankine cycle 6 includes a vapor turbine 282, an electrical generator 280, a condenser 284, and a feed-fluid pump 287. In the second Rankine cycle 6, the pump 287 develops a high pressure to send a working fluid 285 through a network of heat exchangers. The working fluid 285 flows through a line 90 to the syngas cleaning unit 32 where it absorbs heat from an MDEA cooler (such as the cooler 180 shown in FIG. 2), and the fluid 285 next flows through a line 91 to the cooler 27 where it receives heat from hot slag 25. The fluid 285 then returns to the syngas clean-up unit 32 through line 92 where, as shown in FIG. 2, it is further heated in a water scrubber heat exchanger 107, receiving heat from hot water 106 that exits a first water scrubber 104. The fluid 285 then flows through line 193 to receive heat from hot sour gas 135 in the heat exchanger 138. The fluid 285 also flows through line 194 to a sour water heat exchanger 130 where it receives heat from syngas exiting a second water scrubber 126, and then flows through line 195 to the saturator heat exchanger 188 to receive heat from an exhaust gas 187 from the saturator heater 186.

Figure 5:
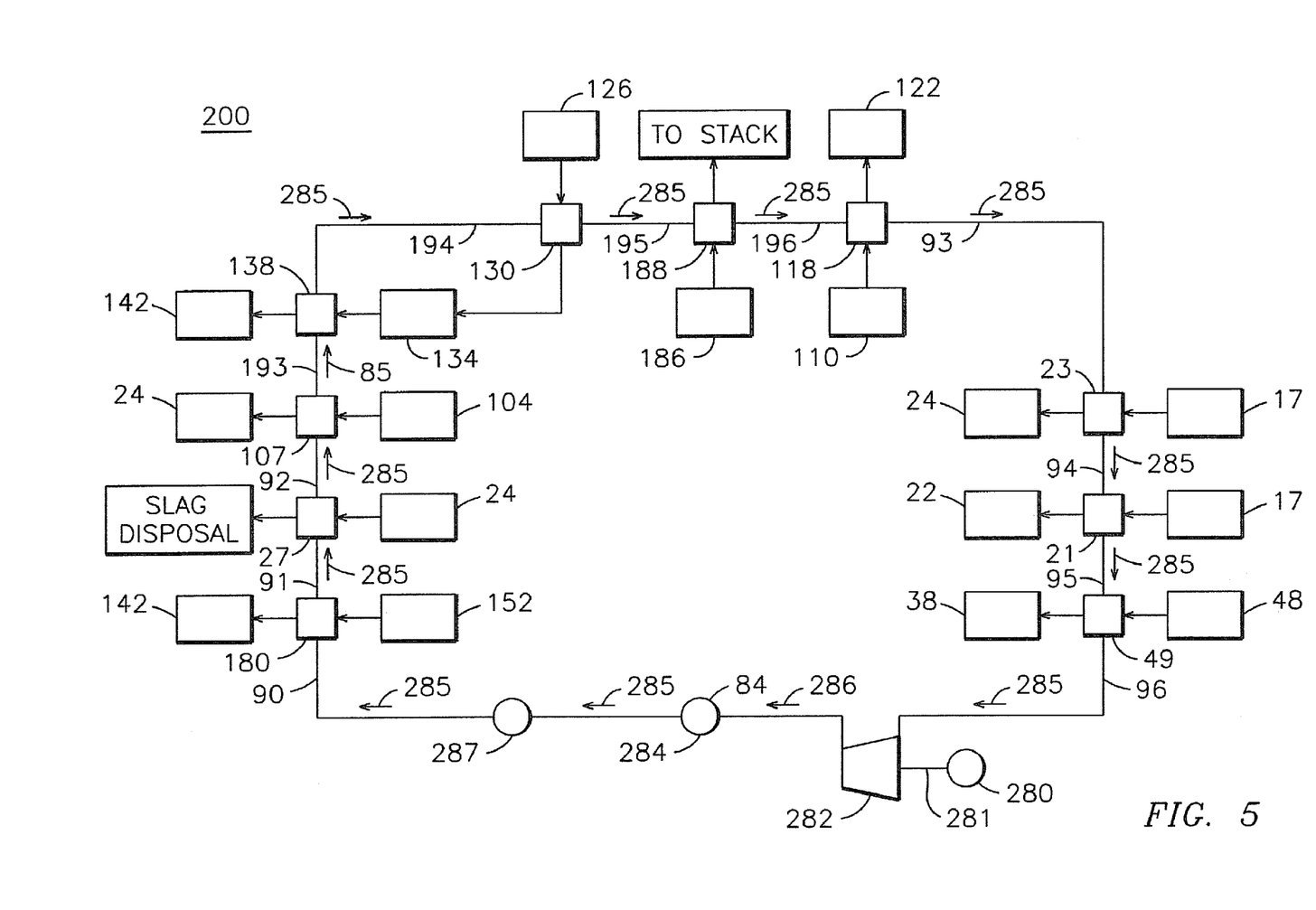
FIG. 5 illustrates a Rankine cycle in the system of FIG. 4.

After exiting the exchanger 188, the fluid 285 flows through a line 196 to a syngas heat exchanger 118 to cool hot syngas 105 leaving a cross heat exchanger 110 (110, 118, 105, and 196 are shown in FIG. 5). The heated fluid 285 then exits the syngas clean-up unit 32 and flows through line 93 to the oxygen cooler 23 where it receives heat from hot oxygen 18 and next flows through a line 94 to the oxygen-depleted air cooler 21 to receive heat from the hot oxygen-depleted air 19.

The hot fluid 285 flows through line 95 to receive heat from the rotor cooling air 47 in heat exchanger 49. The heated fluid 285 is next directed into the vapor turbine 282 where the working fluid 285 expands, thereby producing power in a rotor shaft 281 to drive the electrical generator 280. After passing through the turbine 282 the cooled, expanded vapor 286 enters the condenser 284 for recycling as feed-fluid 285. Other heat sources such as tail gas exhaust from the sulfur recovery unit (not shown), Claus reactors and a SCOT reactor in the sulfur recovery unit (not shown) may be integrated with the second Rankine cycle 6 for recovery of more heat.

FIG. 5 illustrates an exemplary order in which heat exchangers heat the working fluid for the second Rankine cycle 6 from heat sources which can be ordered to thermodynamically optimize the heat recovery system.

With the second Rankine 6 cycle recovering heat from a range of sources, the second cycle can be incorporated into existing IGCC systems and NGCC systems retrofitted to operate as IGCC systems without requiring redesign and replacement of key components such as the HRSG. In designs with the second Rankine cycle 6 recovering heat from the syngas cooler, the operation of the HRSG, which is normally running at high pressure, is not adversely affected.

Chemicals used as an organic working fluid for the second Rankine cycle 6 may include halocarbon refrigerants, such as R-245fa, hydrocarbon gases, ammonia, and carbon dioxide, or a mixture thereof. An exemplary hydrocarbon gas is isopentane. The heat exchangers for the working fluid in the system 200 may be optimally designed for a selected working fluid.

Use of organic working fluids in the lower temperature Rankine cycle 6 in the system 200 brings advantages of a low boiling point, a low specific volume and a low critical pressure. These characteristics enable the organic fluid to perform in under supercritical conditions while at a relatively low temperature. and with a relatively small turbine, thereby reducing the capital cost of installing the cycle. When in the vapor state the organic working fluid may have a minimum temperature of 250° F. (121 C) but the minimum temperature may range between 200° F. (93 C) and 280° F. (138 C). The maximum temperature of the organic vapor may be about 300° F. (149 C), but may range from 280° F. (138 C) to at least 325° F. (163 C).

Operating a second low temperature, low pressure Rankine cycle with an organic fluid in a supercritical mode, at pressures above the critical pressure, increases the heat transfer efficiency as the heat transfer to the fluid is more efficient than when performing an analogous process using water as the working fluid. This is because, in the low temperature, low pressure cycle, the temperature differences between the working fluid and the various heat sources are relatively small while the organic fluid is able to reach a supercritical superheated state.

When using an organic fluid, such as Genetron 245fa, there is no need for superheating the fluid before expanding it in the turbine because it has a positive slope in its saturation vapor line in the two-phase dome. This decreases the size of the heat exchangers needed and reduces the possibility of having moisture at the outlet of the turbine. Use of an organic working fluid in the second Rankine cycle may be best suited for new IGCC power generation plants where the HRSG and steam turbine can be optimally designed to recover heat from the greatest number of heat sources, e.g., all sources above 800° F. (426 C). Recovery of heat from these relatively low temperature heat sources is more effective when the working fluid is above the critical pressure and a relatively small temperature difference between the working fluid and the heat source provides a higher heat transfer efficiency. For example, an organic fluid critical pressure of about 530 psia (3653 kPa) is far less than the 3200 psia (22058 kPa) critical pressure of water.

While the preferred embodiments of the invention have been illustrated and described, the invention is not so limited. Numerous modifications, changes, variations, substitutions and equivalents will occur to those skilled in the art without departing from the spirit and scope of the invention which is only limited by the claims which follow.

The invention claimed is:

1. A method of generating power in a system having a gas turbine subsystem generating a hot exhaust gas, comprising using heat exchangers to derive sensible heat from components within the system and providing the sensible heat to each of at least two Rankine cycles, a first of the Rankine cycles operating a first vapor turbine at a relatively high pressure and a second of the Rankine cycles operating a second vapor turbine at a lower pressure than the relatively high operating pressure of the first vapor turbine, wherein the first vapor turbine is a steam turbine and the second vapor turbine operates with a second working fluid comprising a constituent taken from the group consisting of ammonia, carbon dioxide and hydrocarbon compounds including halocarbon refrigerants.

2. The method of claim 1 wherein sensible heat provided to a first of the Rankine cycles is received from a relatively high temperature source and sensible heat provided to a second of the Rankine cycles is received from multiple heat sources all having a lower temperature than the relatively high temperature source.

3. The method of claim 1 wherein a heat exchanger coupled to the second vapor turbine is optimally designed for the second working fluid.

4. The method of claim 1 wherein heat exchangers heat the second working fluid from heat sources configured to thermodynamically optimize heat recovery.

5. The method of claim 1 wherein the second working fluid operates under supercritical conditions.

6. The method of claim 1 wherein the second Rankine cycle recovers heat from a syngas cooler.

* * * * *